US 7,190,469 B1

(12) United States Patent
Gomi

(10) Patent No.: US 7,190,469 B1
(45) Date of Patent: Mar. 13, 2007

(54) PRINTING SYSTEM FOR PRINTING INTERRUPT JOBS

(75) Inventor: Tomohiro Gomi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 757 days.

(21) Appl. No.: 09/664,383

(22) Filed: Sep. 18, 2000

(30) Foreign Application Priority Data

Sep. 20, 1999 (JP) ................................. 11-264900

(51) Int. Cl.
*G06F 15/00* (2006.01)
*G06K 1/00* (2006.01)

(52) U.S. Cl. .................................... 358/1.14; 358/1.15
(58) Field of Classification Search ................. 358/1.1, 358/1.9, 1.11–1.18, 144, 296, 437, 468
See application file for complete search history.

(56) References Cited

U.S. PATENT DOCUMENTS 5,206,735 A * 4/1993 Gauronski et al. .......... 358/296
5,239,648 A * 8/1993 Nukui ......................... 707/10
5,832,301 A   11/1998 Yamaguchi .................. 710/48
6,025,925 A * 2/2000 Davidson et al. .......... 358/1.15
6,130,757 A * 10/2000 Yoshida et al. ............ 358/1.15
6,332,170 B1* 12/2001 Ban ............................. 710/6

FOREIGN PATENT DOCUMENTS

JP          9-146726          6/1997

* cited by examiner

*Primary Examiner*—Gabriel I. Garcia
*Assistant Examiner*—Thierry L. Pham
(74) *Attorney, Agent, or Firm*—Fitzpatrick, Cella, Harper & Scinto

(57) ABSTRACT

With the present invention, an interrupt print job processed according to an interrupt print instruction can be prohibited from being interrupted by another print job in multiple. With the present invention, if an interrupt-instructed print job has not been processed actually, the user of that print job can be notified of it.

23 Claims, 17 Drawing Sheets

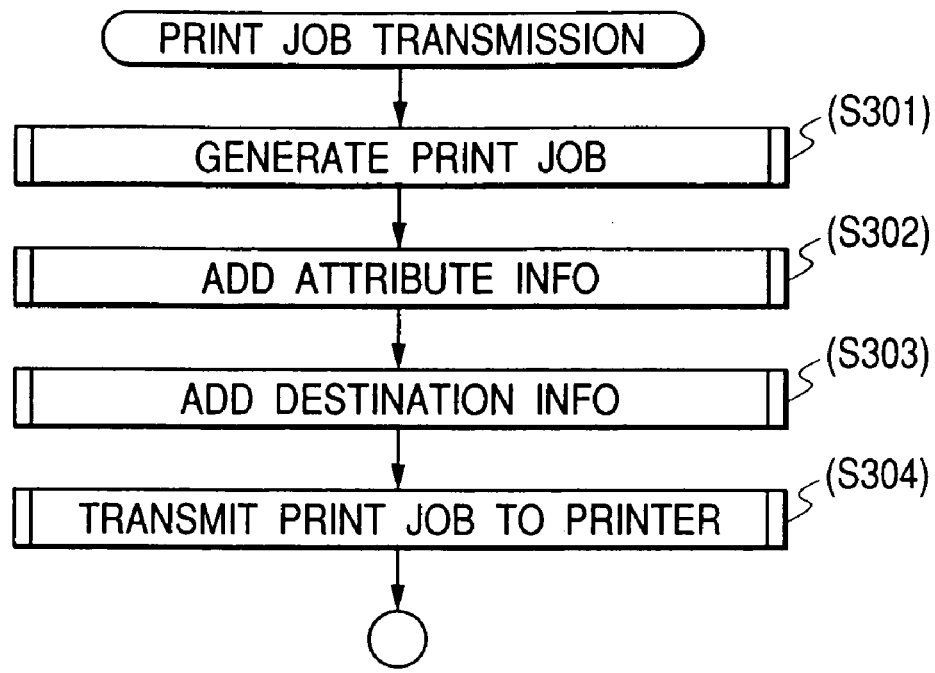
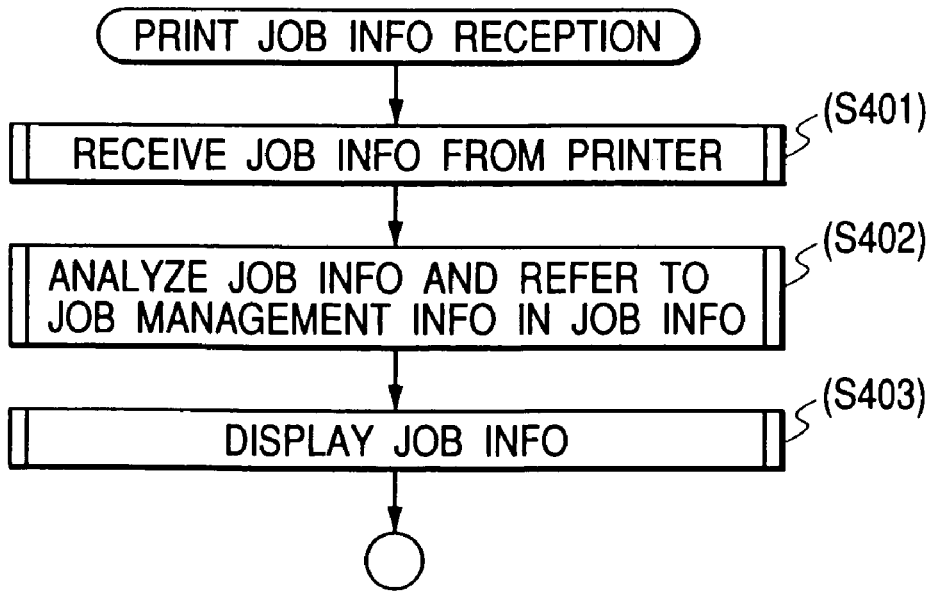

FIG. 6

| JOB | | |
|---|---|---|
| OPTION (O) HELP (H) | | |

| PRINTER STATUS | IN-SPOOLER JOB | IN-DEVICE JOB | PORT |
|---|---|---|---|

DOCUMENT : wwwwwwwwwwwwwwwwwwwwwwwwwwwww
OWNER : wwwwwwwwwwwwwwwwwww
SIZE : wwww KB

| DOCUMENT | STATUS | OWNER | SIZE |
|---|---|---|---|
| △ SUM 1.x0s | PRINTING | THIRO | 32 |
| ○ SUM 1.x0s | WAITING | THIRO | 32 |
| ○ SUM 1.x0s | WAITING | THIRO | 32 |

POINTER 1601 →

| JOB ID | SUSPENSION FLAG |
|--------|-----------------|
| 1 | F |
| 2 | F |
| 3 | F |
| 4 | F |

16-2

POINTER 1601 →

JOB 5 ADDED

| JOB ID | SUSPENSION FLAG |
|--------|-----------------|
| 1 | F |
| 2 | F |
| 3 | F |
| 4 | F |
| 5 | F |

16-3

POINTER 1601 →

JOB 1 PRINTED OR CANCELLED

| JOB ID | SUSPENSION FLAG |
|--------|-----------------|
| 2 | F |
| 3 | F |
| 4 | F |
| 5 | F |

FIG. 19

MEMORY MAP OF MEM MEDIUM
(FD, CD-ROM ETC.)

| DIRECTORY |
|---|
| PROGRAM CODES FOR FLOWCHART OF FIG. 3 |
| PROGRAM CODES FOR FLOWCHART OF FIG. 4 |
| PROGRAM CODES FOR FLOWCHART OF FIG. 5 |
| PROGRAM CODES FOR FLOWCHART OF FIGS. 12 AND 13 |
| PROGRAM CODES FOR FLOWCHART OF FIG. 14 |
| PROGRAM CODES FOR FLOWCHART OF FIG. 17 |
| |

PRINTING SYSTEM FOR PRINTING INTERRUPT JOBS

BACKGROUND OF THE INVENTION

1. Field of the Invention

The present invention relates to an information processor and a printer used with a printing system which can allow for interrupt printing.

2. Related Background Art

In a prior printing system composed of a computer and a printer, the printer could allow for interrupt printing. When such a printer received interrupt-instructed print jobs in sequence, it performed multiple interrupt processing of these print jobs or placed an interrupt print job into waiting state.

SUMMARY OF THE INVENTION

In the prior system described above, however, a print job which had been preferentially processed according to an interrupt print instruction might be interrupted by another print job. The user could not know that his/her own print job was interrupted by other print jobs in multiple.

In addition, even when an interrupt-instructed print job had not been processed actually, the user of that print job was not notified of it and could not know the execution status for that print job, since any multiple interrupt processing was prohibited.

Therefore, with the present invention, an interrupt print job processed according to an interrupt print instruction can be prohibited from being interrupted by another print job in multiple. With the present invention, if an interrupt-instructed print job has not been processed actually, the user of that print job can be notified of it.

BRIEF DESCRIPTION OF THE DRAWINGS

FIG. 3 is a flowchart showing a first data processing in an information processor;

FIG. 4 is a flowchart showing a second data processing in an information processor;

FIG. 6 shows an example of a list of print jobs;

FIG. 16 is an explanatory view showing a job readout table;

FIG. 19 shows a memory map of a memory medium in which a data processing program is stored.

DESCRIPTION OF PREFERRED EMBODIMENTS

Figure 1:
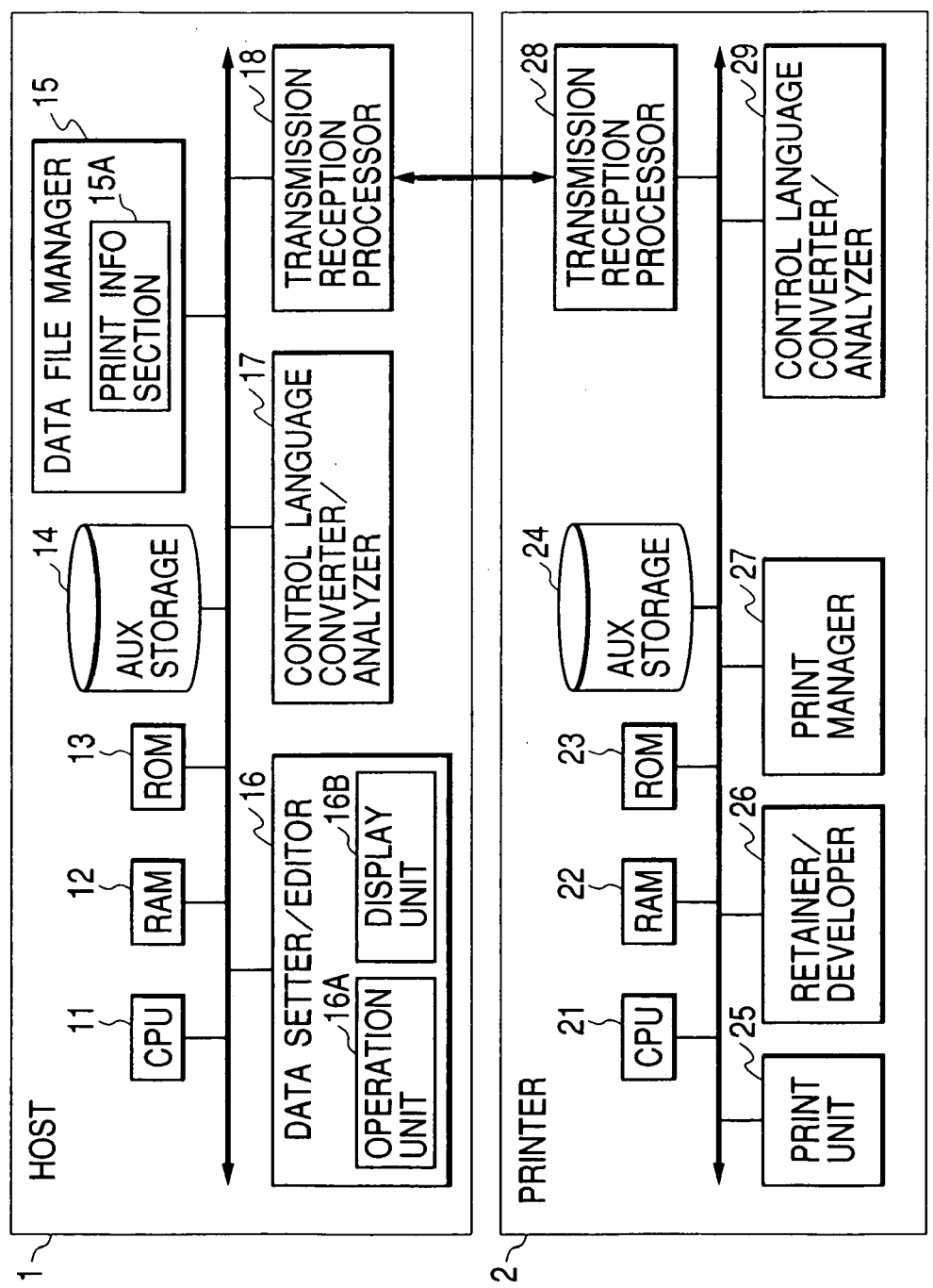
FIG. 1 is a block diagram for explaining the configuration of a printing system.

FIG. 1 is a block diagram for explaining the configuration of a printing system.

In the figure, the reference numeral 1 denotes a host computer (which may be an information processor or an information processing terminal) which transmits print information (also called print data) composed of print data and control code to a printer 2. The host computer 1 performs two-way communication with the printer 2 and acquires printer status information from the printer 2.

It should be appreciated that the printer 2 may be an input/output device which can perform a print operation based on print information from the host computer and may be, for example, a copier having a print function or a multi-function device having a print function and a FAX function.

In the host computer 1, the reference numeral 11 denotes a CPU which executes various control programs and application programs stored in a ROM 13 and an auxiliary storage 14 for a variety of data processing. The reference numeral 12 denotes a RAM which functions as a working memory for the CPU 11, and the capacity of the working memory can be extended with optional RAMs.

The reference numeral 15 denotes a data file manager which comprises a print information section 15A. The reference numeral 16 denotes a data setter editor which is composed of an operation unit 16A and a display unit 16B. The data setter editor 16 is implemented, for example, by executing application programs such as word processing software or spreadsheet software through the CPU 11. The reference numeral 17 denotes a control language converter/analyzer which converts and analyzes a control language to be used for transmission/reception. The control language converter/analyzer 17 is implemented, for example, by executing a printer driver program through the CPU 11.

On the contrary, the printer 2 comprises a print mechanism unit to form a permanently visible image on recording paper and a control unit to control the overall printer.

In the printer 2, the reference numeral 21 denotes a CPU which executes various control programs stored in a ROM 23 and an auxiliary storage 24 for overall control of the devices. The reference numeral 22 denotes a RAM which functions as a working memory for the CPU 21, and the capacity of the working memory can be extended with optional RAMs.

The reference numeral 28 denotes a transmission/reception processor which delivers print information (print data) received from the host computer 1 to a control language converter/analyzer 29. The print information is analyzed by the control language converter/analyzer 29 and then developed to image data by a retainer/developer 26. The reference numeral 25 denotes a print unit which prints the image data developed and retained by the retainer/developer 26 on a recording medium. The reference numeral 27 denotes a print manager which manages the output status and the like of a received print job and notifies the host computer 1 of the current print status via the transmission/reception processor 28. The print manager 27 also manages a list of retained print jobs and stores management information for these print jobs in the auxiliary storage 24 as required.

In the printing system as configured above, the control language converter/analyzer 17 generates print data and control code to be provided to the printer 2 based on the data generated by an application program. The transmission/reception processor 18 controls an interface for transmission to or reception from the printer 2, transmits a print job composed of the print data and the control code to the printer 2, and receives information from the printer 2.

In the printer 2, the transmission/reception processor 28 receives the print job and passes the print data and the control code which constitute the print job to the control language converter/analyzer 29. The control language converter/analyzer 29 analyzes the print job and the retainer/developer 26 generates image data based on the result of the analysis. The print unit 25 performs printing onto paper based on the image data.

The flow of print process will be described below more specifically.

Figure 2:
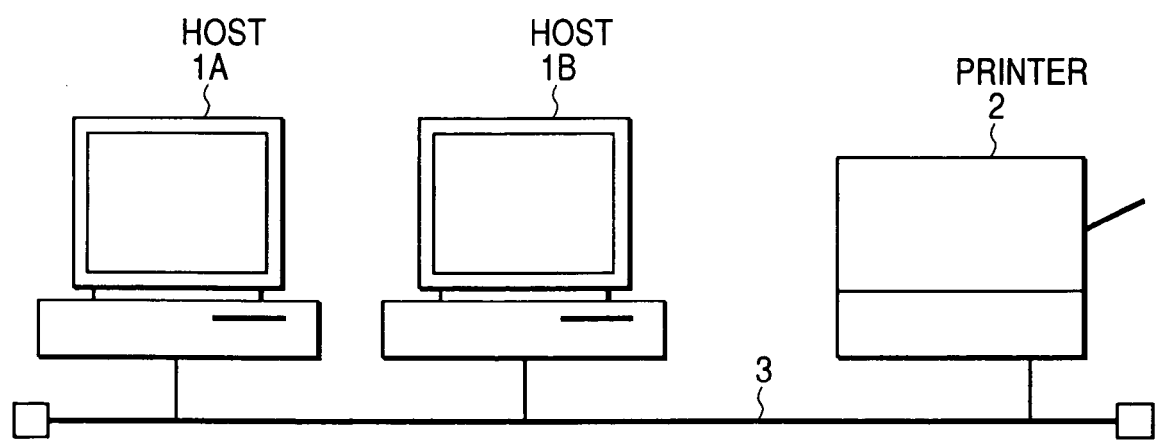
FIG. 2 is a block diagram for explaining the network configuration for a printing system.

FIG. 2 is a block diagram for explaining the network configuration for a printing system.

The reference numeral 1A denotes a host computer which is printing. The reference numeral 1B denotes a host computer which transmits an interrupt-instructed print job. The reference numeral 2 denotes a printer which is shared by the host computers 1A and 1B.

The reference numeral 3 denotes a network (LAN) configured by, for example, Ethernet over which the host computer 1A, the host computer 1B, and the printer 2 can communicate with each other according to a predetermined protocol.

The printer 2 is now executing a print job from the host computer 1B according to an attribute contained in the print job. The CPU 11 of the host computer 1A executes a control program to generate a print job. When the user specifies an attribute for this print job and the destination of job management information for this print job, the CPU 11 of the host computer 1A adds information representing the specified attribute and destination to the print job and transmits it to the printer 2 via the transmission/reception processor 18. It should be appreciated that an attribute may indicate whether an interrupt print or preferential print is specified.

The printer 2 manages job management information for each of the print jobs including the print job transmitted from the host computer 1B and the print job transmitted from the host computer 1A. The CPU 11 of the host computer 1B acquires job management information for each print job to be managed and displays the print status of the transmitted print job on, for example, the display unit 16B of the data setter editor 16, based on the acquired job management information and the specified attribute.

More specifically, the CPU 11 compares the acquired job management information with the specified attribute (whether an interrupt print or a preferential print is specified) and if it is determined that an interrupt print is specified and such an interrupt is enabled, the CPU 11 indicates that the print job is interrupt-printed or preferentially printed. If it is determined by comparing the acquired job management information with the specified attribute that an interrupt print is specified but such an interrupt is disabled, the CPU 11 indicates that the print job is processed in normal sequence.

The printer 2 receives the print jobs from the host computers 1A and 1B in sequence and temporarily stores print data for the print jobs in the RAM 22 or the auxiliary storage 24. In the printer 2, an attribute added to each of the received print jobs (whether an interrupt print or a preferential print is specified) is compared with the status for interrupt processing managed by the print manager 27 (for example, whether there is any interrupt-instructed print job at this point of time) to determine whether an interrupt-instructed print job can be interrupt-processed or whether a print job can be preferentially processed. The determination result as to whether a print job can be interrupt-processed is added to the job management information for that print job and the host computer is notified of it according to the information representing destinations to be notified, as required.

The print data for each received print job is analyzed by the control language converter/analyzer 29 and then converted by the retainer/developer 26 into output data (image data) which can be printed by the print unit 25. Thus generated output data is printed by the print unit 25 on a recording medium.

The print manager 27 manages print jobs to be interrupt-processed and print jobs to be normally processed in a discriminable manner, based on the determination result as to whether a print job can be interrupt-processed. In addition, the print manager 27 stores print data for the print jobs to be interrupt-processed and print data for the print jobs to be normally processed in the auxiliary storage in a discriminable manner, based on the determination result as to whether a print job can be interrupt-processed.

FIG. 3 is a flowchart showing an example of a first data processing procedure in the information processor (host computer) according to the present invention. This corresponds to a procedure used to perform a print operation (to transmit a print job) on the host computer. This procedure consists of the steps (S301) through (S304).

At the step (S301), a print job is generated. At the step (S302), according to an attribute specified by the user, information representing the attribute is added to the generated print data. It should be appreciated that an attribute which can be specified by the user is an interrupt print or a preferential print.

At the step (S303), as specified by the user, information representing the destinations of job management information is added to the print job. The information representing the destinations includes the network address, the name, and port names of the host computer. Its e-mail address may be included. At the step (S304), the print job is transmitted to the printer 2.

The host computer displays the job management information for the print job according to the status of the printer 2. FIG. 4 is a flowchart showing an example of a second data processing procedure in the information processor (host computer) according to the present invention. This corresponds to a procedure used to display the job management information on the host computer. This procedure consists of the steps (S401) through (S403).

At the step (S401), job information is acquired from the printer 2. At the step (S402), job management information in the job information is referred to. At the step (S403), consistency of the information is checked and a list of print jobs is displayed on the display unit 16B. If a print job transmitted from the host computer 1A is specified to be interrupt-printed, a notice is also displayed that the print job is being interrupt-processed.

Figure 5:
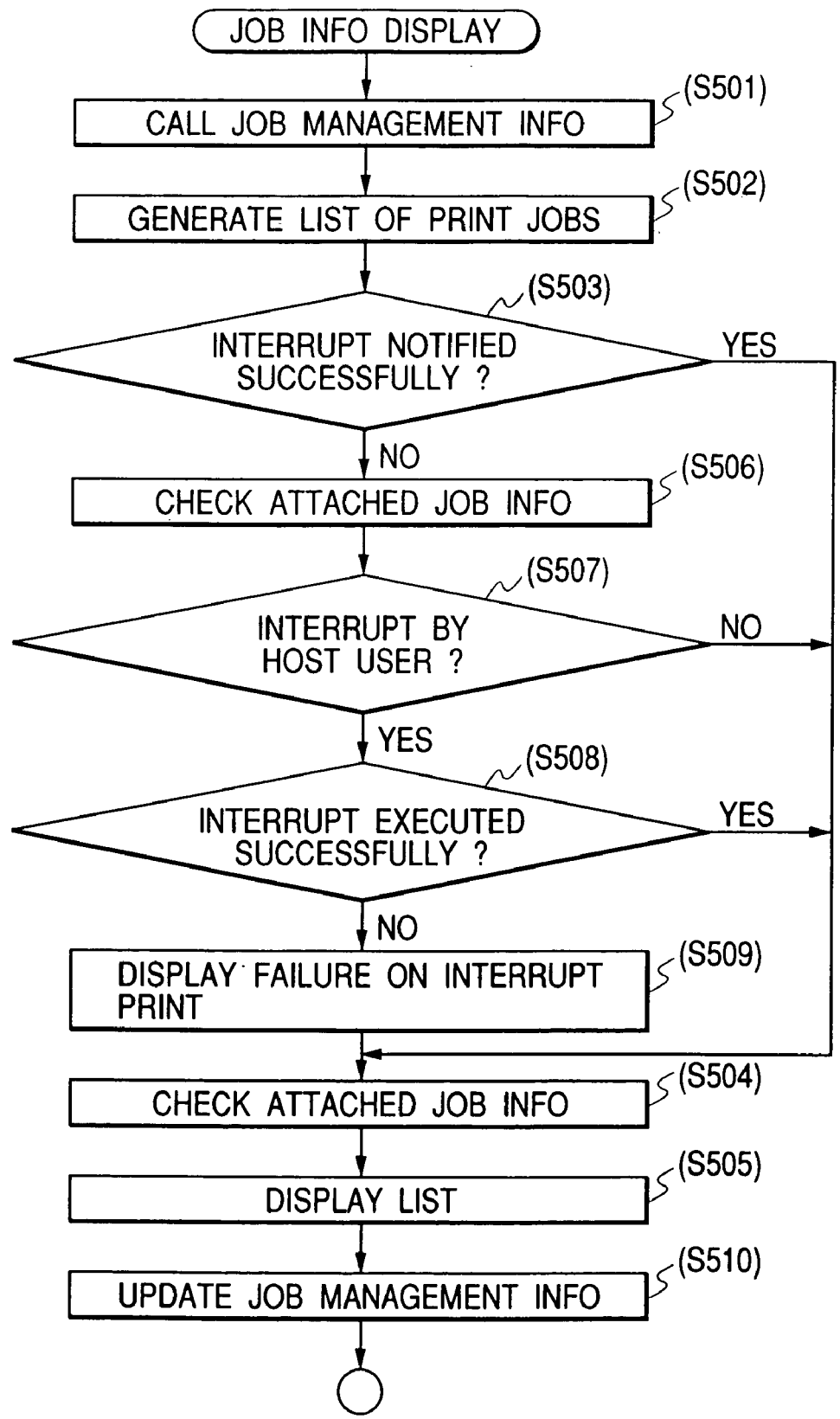
FIG. 5 is a flowchart showing a third data processing in an information processor.

Now, the step (S403) of FIG. 4 will be described below in detail with reference to FIG. 5. FIG. 5 is a flowchart showing an example of a third data processing procedure in the information processor according to the present invention.

This corresponds to the step (S403) shown in FIG. 4 to display the job information. This procedure consists of the steps (S501) through (S510).

At the step (S501), job management information is referred to. At the step (S502), a list of print jobs is generated based on the job management information. FIG. 6 shows an example of a list of print jobs. In the window of FIG. 6, the document name, status, owner, and data size are displayed for each job.

Next, at the step (S503) of FIG. 5, it is determined whether a notice that an interrupt print had been processed successfully is given. If it is determined that a notice that an interrupt print had been processed successfully is given, the attached job information is checked at the step (S504) and the list is displayed on the display unit at the step (S505). At the step (S510), the job management information is updated and the process proceeds to other operations.

If the printer 2 is prohibited from processing multiple interrupts and the printer 2 receives an interrupt-instructed print job while another print job is already being interrupt-processed, the print manager 27 of the printer 2 does not execute further interrupt and notifies the host computer that the interrupt-instructed print job was not processed. Then the host computer detects a failure of interrupt print.

Figure 7:
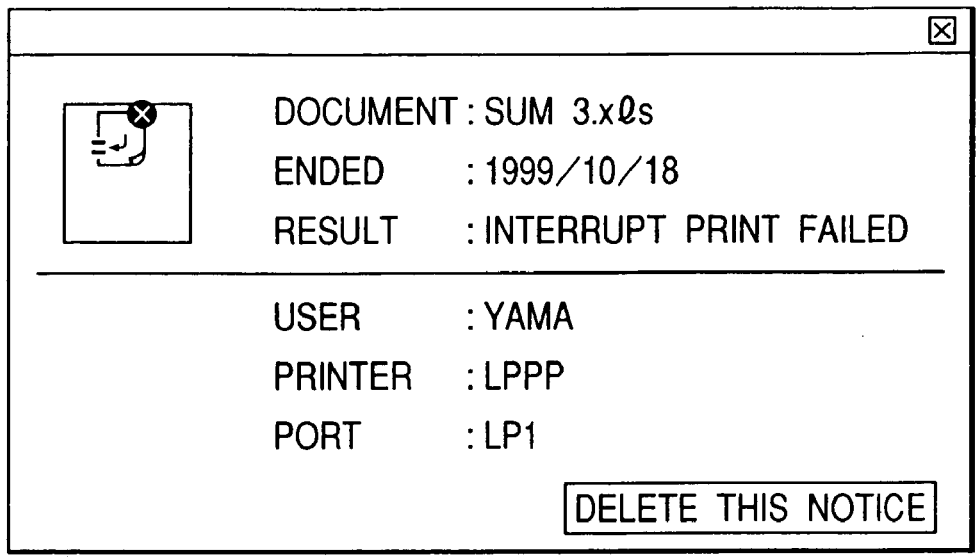
FIG. 7 shows an example of an interrupt print failure notice.

Therefore, if it is determined at the step (S503) that a notice that an interrupt print had not been processed successfully is given, the process proceeds to the step (S506). At the step (S506), the attached job information is checked and at the step (S507), it is determined whether the user of the host computer desired the interrupt-instructed print job. If the determination result of the step (S507) is NO, the process proceeds to the step (S504). If YES, the process proceeds to the step (S508). At the step (S508), based on the determination results of the steps (S503) and (S507), it is finally determined whether the interrupt print has been processed successfully or unsuccessfully. If it is determined that the interrupt print has been processed successfully, the process proceeds to the step (S504). If it is determined that the interrupt print has failed, a notice is displayed at the step (S509) that the interrupt print has not been processed and changed to normal print. FIG. 7 shows an example of the notice given at the step (S509).

Now, a printing system which can allow for interrupt printing will be described below in detail.

Figure 8:
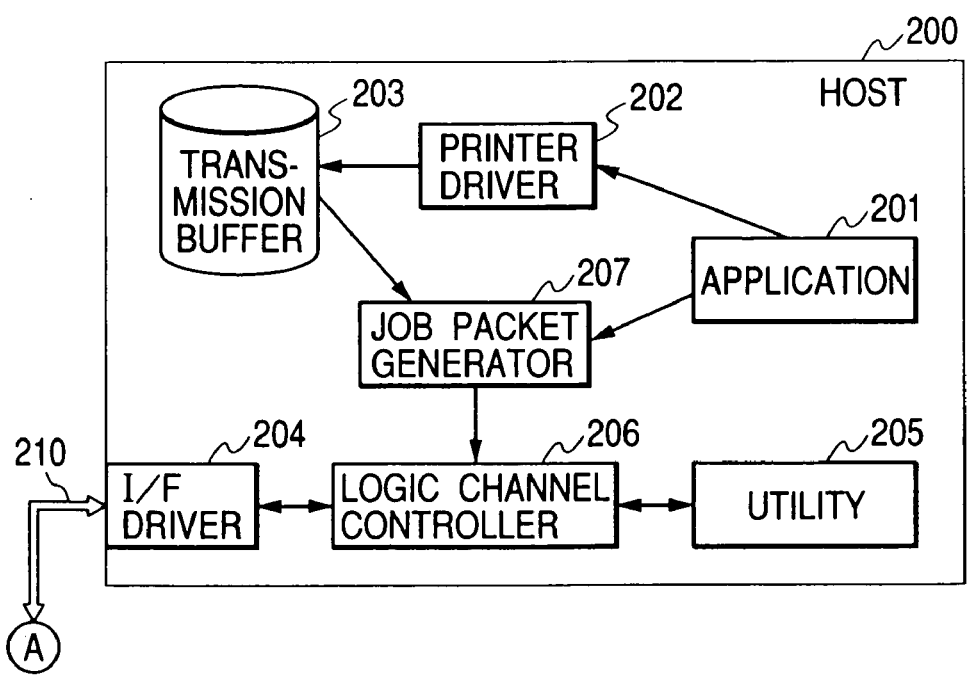
FIG. 8 is a block diagram showing the feature configuration of a printer for a printing system.
Figure 9:
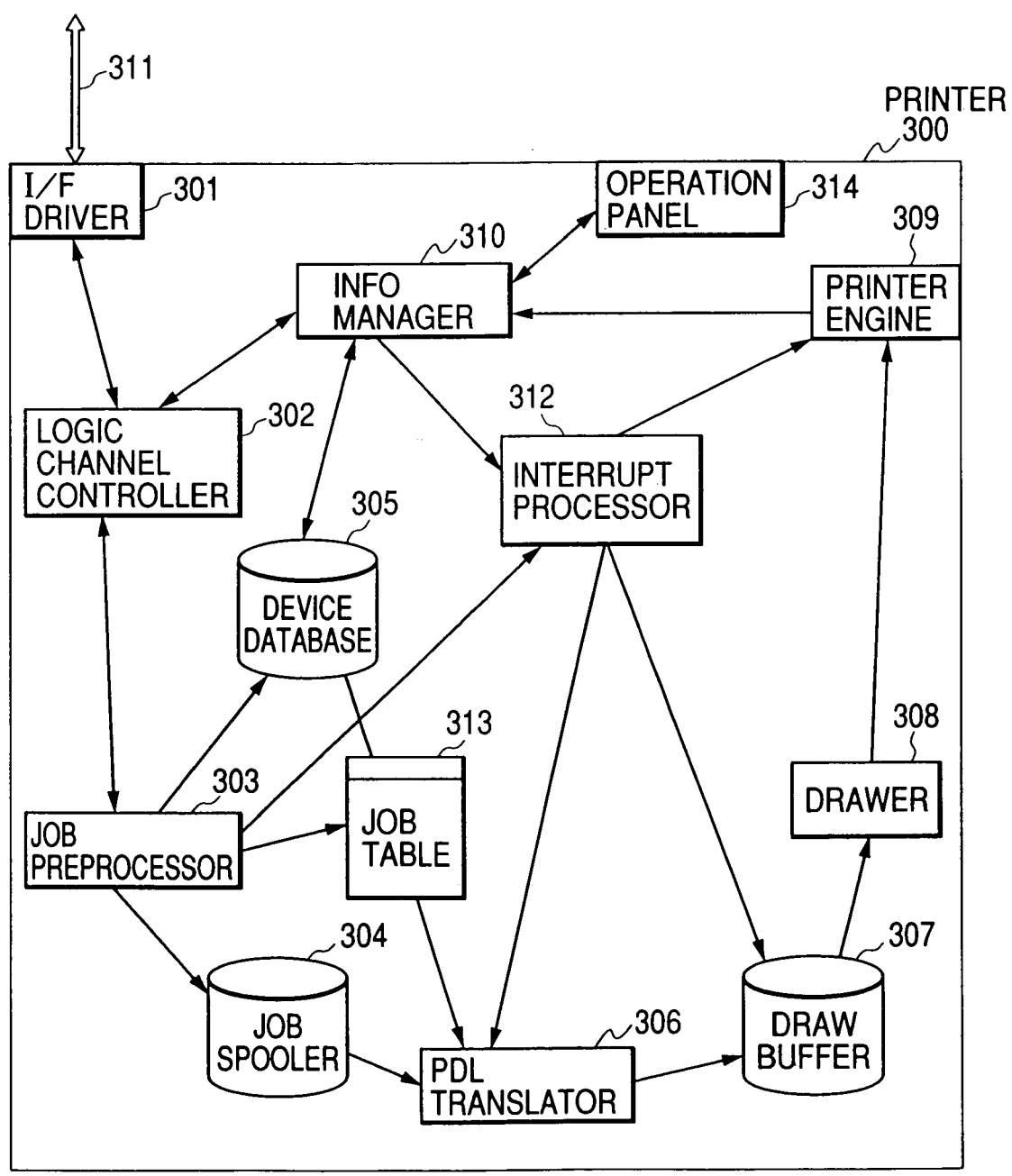
FIG. 9 is a block diagram showing the feature configuration of a printer for a printing system.

FIG. 8 and FIG. 9 show a printing system according to an embodiment of the present invention and each of them is a block diagram showing the feature configuration of a printing system which can implement the mechanism for transmitting a print job from a host computer to a printer, for acquiring information for the printer, and for setting environmental conditions.

The printing system comprises a host computer 200 for generating a print job, a printer 300 for actually printing on paper based on the print job, and interfaces 210 and 311 for connecting the host computer 200 and the printer 300. Although the interfaces 210 and 311 may be a local interface specified in the IEEE 1284 standard or a network interface such as Ethernet, the following description addresses the case where a local interface is used.

In FIG. 8, the host computer 200 comprises an application 201, a printer driver 202, a transmission buffer 203, an I/F driver 204, a utility 205, a logic channel controller 206, and a job packet generator 207.

The application 201 allows the user to manipulate graphical user interfaces and generates desired image data accordingly. The printer driver 202 converts the image data generated by the application 201 into page description language (hereinafter abbreviated as PDL) data which can be printed by the printer 300. The transmission buffer 203 temporarily stores the PDL data generated by the printer driver 202. The job packet generator 207 generates a predetermined job packet from the PDL data stored in the transmission buffer 203 and job information held by the application 201.

The utility 205 allows the user to manipulate graphical user interfaces to check the status of the printer 300, to check the status of a transmitted print job, to cancel the print job, to interrupt the print job, to suspend the print job, or to resume the print job and in response to the user manipulation, generates a management packet which can be interpreted by the printer 300.

The logic channel controller 206 assigns the job packet and the management packet to different channels for multiplexing the transport layer among the seven layers as specified by OSI. The I/F driver 204 makes the conversion from logical data to electrical signals and vice versa for communication with the interface 210.

In FIG. 9, the printer 300 comprises an I/F driver 301, a logic channel controller 302, a job pre-processor 303, a job spooler 304, a device database 305, a PDL translator 306, a draw buffer 307, a drawer 308, a printer engine 309, an information manager 310, an interrupt processor 312, and a job table 313.

The I/F driver 301 makes the conversion from logical data to electrical signals and vice versa for communication with the interface 311. The logic channel controller 302 assigns the job packet and the management packet to different channels for multiplexing the transport layer among the seven layers as specified by OSI. The job pre-processor 303 analyzes the received job packet and stores the job information for the print job in the device database 305 and the PDL data in the job spooler 304, separately.

The job spooler 304 is made up of an HDD, a flash memory, a DRAM, or other bulk memory devices to temporarily store the PDL data for the print job until the print job is completed. At the point of time when it is detected that the ejection of the last page in the print job has been completed, the PDL data for the print job stored in the job spooler 304 is deleted or invalidated.

The job table 313 describes the order of processing print jobs. The PDL translator 306 selects the print jobs in order as described by the job table 313, analyzes the job information stored in the device database 305 and the PDL data stored in the job spooler 304 for each of the print jobs to generate intermediate data which can be drawn in real time (this operation is also referred to as "translation"), and then stores the intermediate data in the draw buffer 307.

The draw buffer 307 temporarily holds the intermediate data in pages until the print job is completed. The drawer 308 acquires the intermediate data from the draw buffer 307, performs renderings on the intermediate data in real time with the paper carriage in the printer engine 309, and then transmits video data to the printer engine 309. The printer engine 309 performs physical printing on paper based on the video data transmitted by the drawer 308, using a known electrophotographic technique.

The information manager 310 receives the management packet transmitted from the host computer 200, acquires information from the device database 305 upon request, executes an instruction to cancel a print job (cancellation request), an instruction to interrupt (interrupt request), an instruction to suspend a print job (print suspension request), an instruction to resume a print job (print resumption request), or an instruction to preferentially print (preferential print request), and detects any job end or device failure to issue a management packet to autonomously notify the host computer 200 of it.

The interrupt processor 312 processes an actual interrupt when an instruction to interrupt a print job is executed.

Data communication between the logic channel controller 206 in the host computer 200 and the logic channel controller 302 in the printer is multiplexed at the transport layer level, for example, according to TCP/IP for network communication or according to any protocol specified in the IEEE 1284/IEEE 1284.4 standard for local communication. This will not be further described here.

A job packet logically transmitted from the job packet generator 207 is received by the job pre-processor 303. The logical path over which the job packet flows is called a job channel. A management packet is communicated between the utility 205 and the information manager 310. The logical path over which the management packet flows is called a management channel. It should be appreciated that both channels are defined to allow for two-way communication but the job channel in the present embodiment may be a one-way channel from the host computer to the printer. In addition, it should be appreciated that the job channel and the management channel are multiplexed at the transport layer level among the seven layers as specified by OSI and the flow processing for one channel cannot affect the other.

Now, the structure of job and management packets will be described below. Job and management packets are defined according to the protocol for the application layer and each has a packet structure composed of a header section and a data section (also referred to as a parameter section). A print job is composed of a plurality of job packets. The collection of job packets composing a print job is called a job script.

Figure 11:
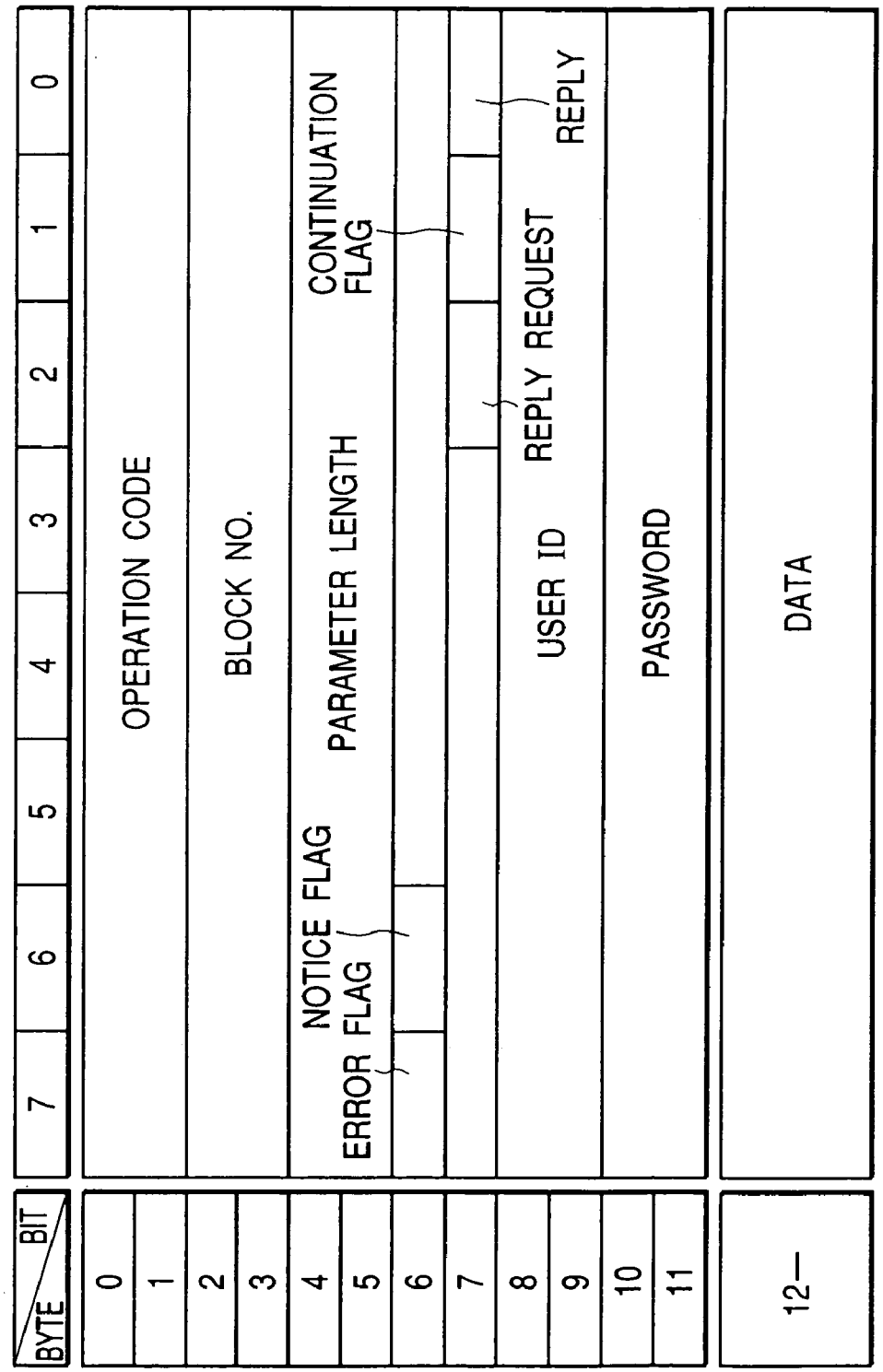
FIG. 11 is an explanatory view showing the configuration of a job packet.

FIG. 11 is an explanatory view showing the structure of a job packet. In the figure, byte numbers are shown in the left column and bit numbers in each byte are shown in the top row. An operation code in bytes 0 to 1 is a 2-byte (16-bit) ID which indicates the function of the packet. For a job packet, it can take on one of the following values:

0x0201: Job start operation

0x0202: Job attribute setting operation

0x0204: PDL data transmission operation

0x0205: Job end operation.

A block number in bytes 2 to 3 is the number used to indicate the correspondence between a job packet transmitted by the transmitter and a reply from the receiver to respond any reply request from the transmitter. For example, suppose that the host computer 200 transmits job packets with block numbers 1, 2, 3 in sequence and an error packet with block number 2 is returned. In this case, the host computer can know that an error occurs in the second job packet.

A parameter length in bytes 4 to 5 indicates the length of a data section in bytes, ranging from 0 to 64 Kbytes.

Bytes 6 to 7 have some bits indicating various flags for a job packet and these flags can be set some values as described below.

Error flag: If this flag is set to 1, it indicates that some error occurs in the printer. This flag is attached to a return packet transmitted from the printer 300 to the host computer 200.

Notice flag: If this flag is set to 1, it indicates that this is not a reply to respond a reply request packet from the host computer 200 to the printer 300 and that the printer 300 notifies the host computer 200 that there is something to be communicated.

Continuation flag: If this flag is set to 1, it indicates that all pieces of data cannot be contained in a data section and the remaining pieces of data are transmitted in the next job packet. The next job packet must have the same operation code and block number as those of the current packet.

Reply request: This flag is set to 1 when the host computer 200 requests a reply packet from the printer 300 to its request packet. If the flag is set to 0, no reply packet is returned when the request packet is normally processed. If any error occurs in the printer, a reply packet with the error flag set to 1 is always issued regardless of whether the reply request flag is set to 0 or 1.

A user ID in bytes 8 to 9 and a password in bytes 10 to 11 are used for authentication when security restrictions are imposed on any operation to be performed with packets.

Byte 12 and succeeding bytes compose a data section in which additional data corresponding to any specified operation code is stored. For a job start operation, a job mode (operation mode) is described as additional data. Operation mode codes which can be specified are as follows:

0x01: Normal processing of a print job. The print job is added as a normal print job to the end of the queue in the printer and normally processed on schedule.

0x04: Interrupt processing of a print job. Since the print job is handled as an interrupt print job, all other print jobs are suspended and the interrupt print job is preferentially processed.

Figure 10:
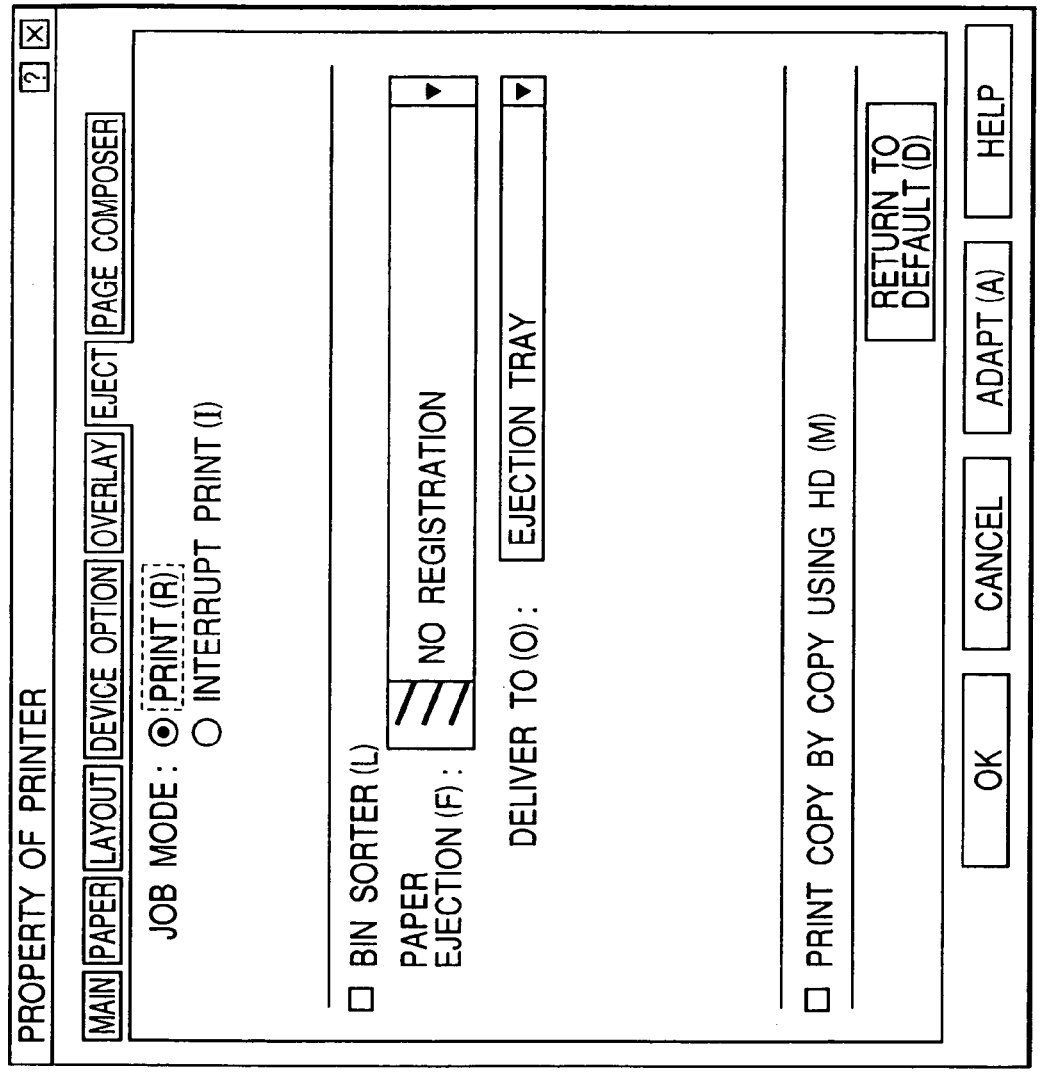
FIG. 10 shows a graphic user interface provided for the user to instruct a desired mode (job mode)

FIG. 10 shows a graphic user interface provided by the printer driver 202 for the user to instruct a desired mode (job mode). In the screen shown in FIG. 10, the "JOB MODE" field has "PRINT (R)" and "INTERRUPT PRINT (I)" selections and radio buttons corresponding to these selections. The radio buttons can be selected exclusively and if any of the buttons is marked with a check, another button previously marked with a check is released. When the radio button for the "PRINT (R)" selection is marked with a check, the job mode is set to 0x01. When the radio button for the "INTERRUPT w PRINT (I)" selection is marked with a check, the job mode is set to 0x04.

For a job attribute setting operation, a job attribute ID and a job attribute value to be set are stored in the data section as additional data. A job attribute ID indicates the attribute for a job or an identifier for the environment and some IDs have been previously assigned to job attributes defined in the ISO-10175 (DPA) standard. The following lists typical job attributes.

Job attribute ID

0x0101: Job name

0x0103: Job owner

0x016: Job size

0x0002: Destination address for job end notice

Other IDs can be assigned to job attributes such as number of copies and monochrome/color depending on the functions of the printer.

For a PDL data transmission operation, the PDL data is placed in the data section as additional data. A job packet can have up to the maximum parameter length of data, that is, up to 64 KB of data and if more data is to be transmitted, excess data is divided into a plurality of job packets having the PDL data transmission operation code and then transmitted. In this case, the continuation flag is set to 1.

For a job end operation, there exists no additional data.

Figure 12:
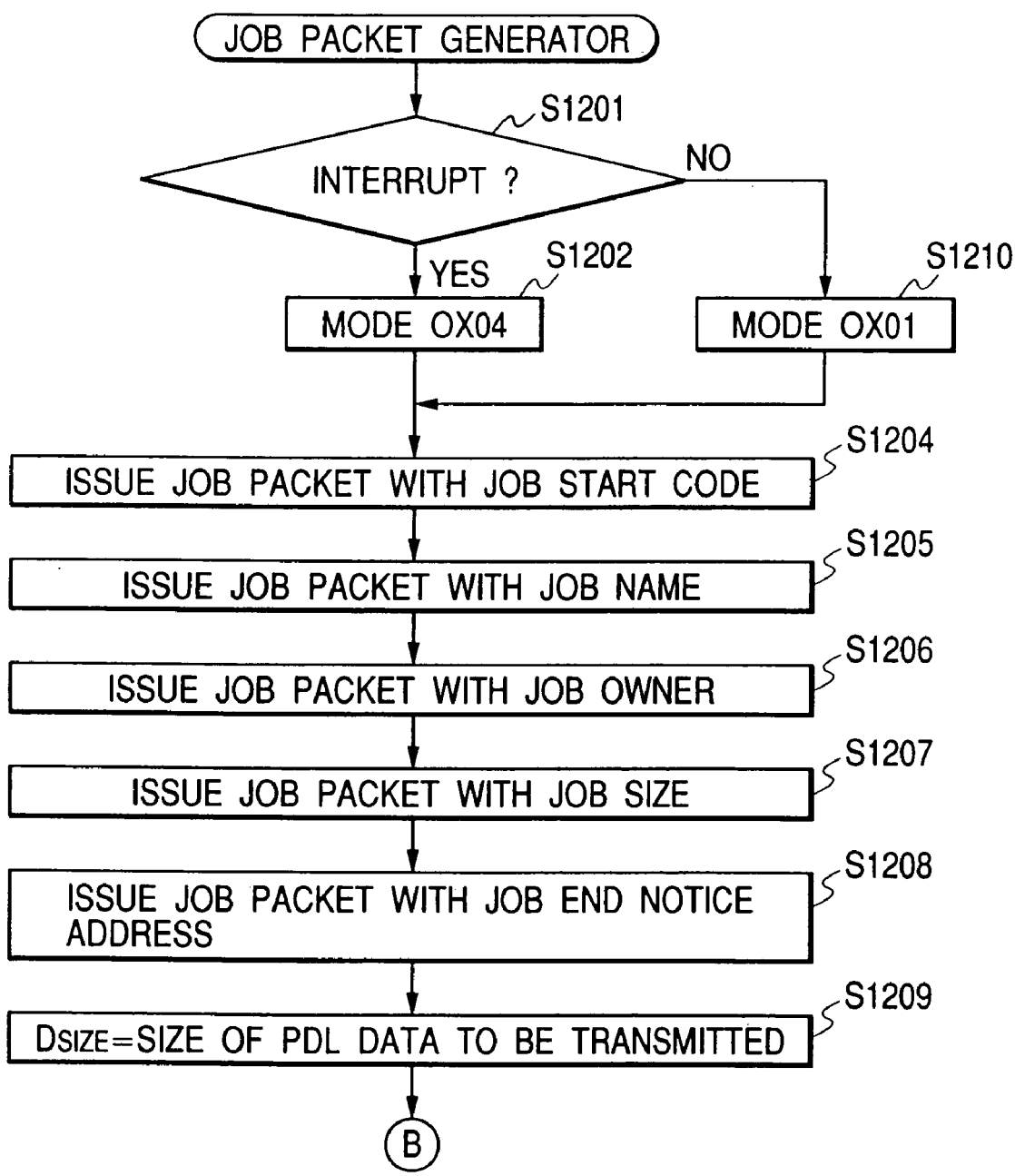
FIG. 12 is a flowchart showing the operation of a job packet generator.
Figure 13:
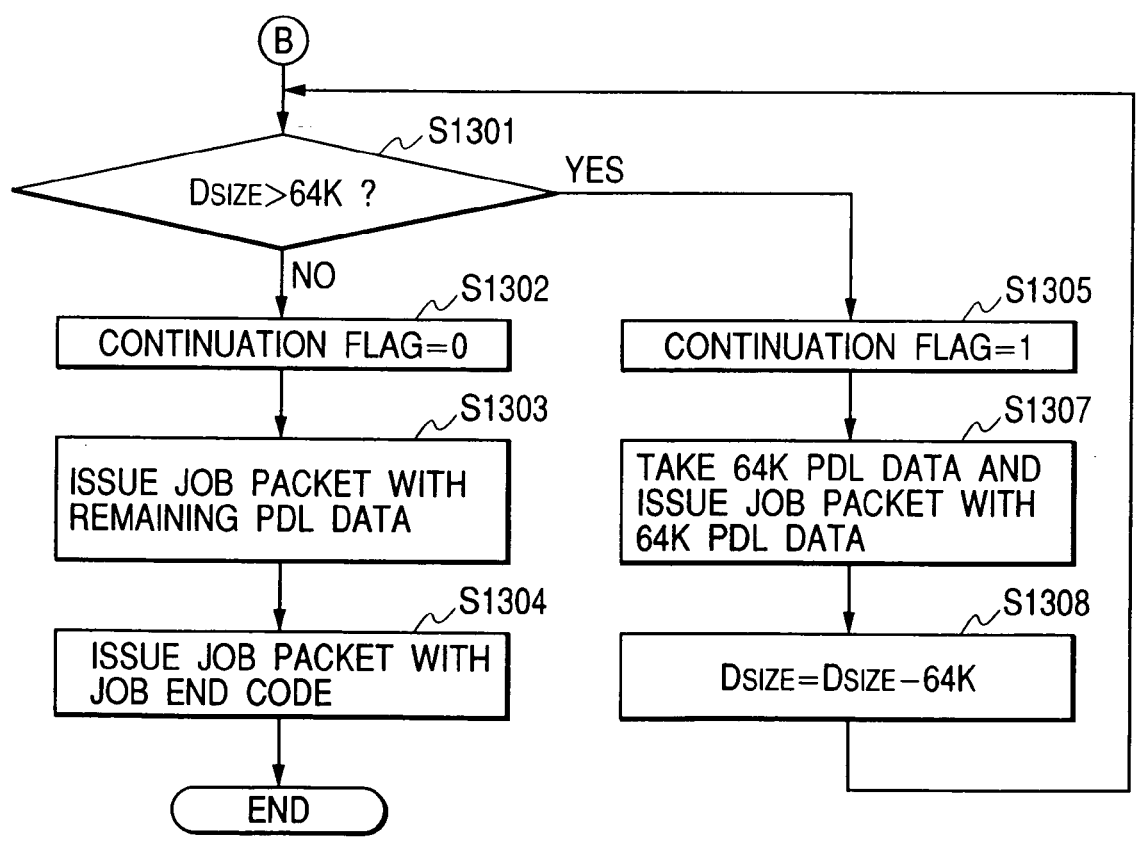
FIG. 13 is a flowchart for explaining the operation of a job packet generator.

Now, the job packet generator 207 in the host computer will be described below. FIG. 12 and FIG. 13 are a flowchart showing the operation of the job packet generator 207.

When the application 201 selects a print instruction, the printer driver 202 is activated first. After the printer driver 202 has stored print data in the transmission buffer 203, the job packet generator 207 starts its operation.

Firstly, at the step 1201, it is determined whether a print job in question is an interrupt print. An interrupt print will be executed if it has been specified by the user on the user interface property screen of the printer driver 202.

If it is an interrupt print, the operation mode is set to 0x04 at the step 1202. If it is not an interrupt print, the operation mode is set to 0x01 at the step 1210.

Next, at the step 1204, a job packet with the job start operation code (=0x0201) in the operation code area is issued to the logic channel controller 206. At this point of time, an operation mode value is set in the data section of the job packet to indicate whether the print job is a normal print job, an interrupt print job, a print suspension job, or a print promotion job.

Thereafter, all operations are used to set job information for the print job until a job end operation instruction is issued.

At the step 1205, the job name is set. A job packet with the job attribute setting operation code (0x0202) in the operation code area and with a job attribute ID which indicates a job name setting (=0x0101) and a name which is the job attribute value in the data section is generated and issued to the logic channel controller 206.

At the step 1206, the job owner is set. A job packet with the job attribute setting operation code (0x0202) in the operation code area shown in FIG. 11 and with a job attribute ID which indicates a job owner setting (=0x0103) and an owner name which is the job attribute value in the data section is generated and issued to the logic channel controller 206.

At the step 1207, the job size is set. A job packet with the job attribute setting operation code (0x0202) in the operation code area shown in FIG. 11 and with a job attribute ID which indicates a job size setting (=0x016a) and a job data size which is the job attribute value in the data section is generated and issued to the logic channel controller 206.

At the step 1208, the destination address for a job end notice of the current print job ("notice address") is set. The job end means that the ejection of the last page in the print job has been completed. A job packet with the job attribute setting operation code (0x0202) in the operation code area shown in FIG. 11 and with a job attribute ID which indicates a notice address setting (=0x0002) and a job end notice address which is the job attribute value in the data section is generated and issued to the logic channel controller 206.

A notice address typically indicates a transmission address of the host computer which transmits a print job. If the transmitter is a local interface according to the 1284.4 standard and the socket ID is 0x10, the notice address will be the string "1284.4:0x20." If the transmitter has an IP address of 172.16.1.1 according to TCP/IP and the port number is 0xb9b9, the notice address will be the string "TCP/IP:172.16.1.1:0xb9b9."

At the step 1209, the size in bytes of PDL data to be transmitted is assigned to the variable "Dsize".

At the step 1301, the value of the variable Dsize is checked to determine whether it is larger than 64 K. The size of data which can be stored in the data section of a job packet is limited to 64 Kbytes at the maximum because the parameter length in the packet header is represented by 16 bits. Therefore, excess data is divided into a plurality of job packets and then these packets are issued.

If the size of the PDL data is larger than 64 K, the continuation flag in the packet header shown in FIG. 11 is set to 1 at the step 1305 and then at the step 1307, a job packet with the PDL data transmission operation code (0x0204) in the operation code area shown in FIG. 11 and with 64 Kbytes of PDL data taken from the transmission buffer 203 in the data section is generated and issued to the logic channel controller 206. In addition, at the step 1308, the size of the PDL data is reduced from Dsize by 64 K which is the size of the transmitted data and the process returns to the branch step 1301.

If the variable Dsize which is the size of the PDL data is 64 K or less at the step 1301, one more job packet with the PDL data transmission operation code completes the transmission of all PDL data. In this case, the continuation flag in the packet header shown in FIG. 11 is set to 0 at the step 1302 to indicate that this is the last PDL data transmission and then at the step 1303, a job packet with the PDL data transmission operation code (0x0204) in the operation code area shown in FIG. 11 and with all remaining PDL data taken from the transmission buffer 203 in the data section is generated and issued to the logic channel controller 206.

Lastly, at the step 1304, a job packet with the job end operation code (0x0205) in the operation code area shown in FIG. 11 is generated and issued to the logic channel controller 206 to end the print job.

Figure 14:
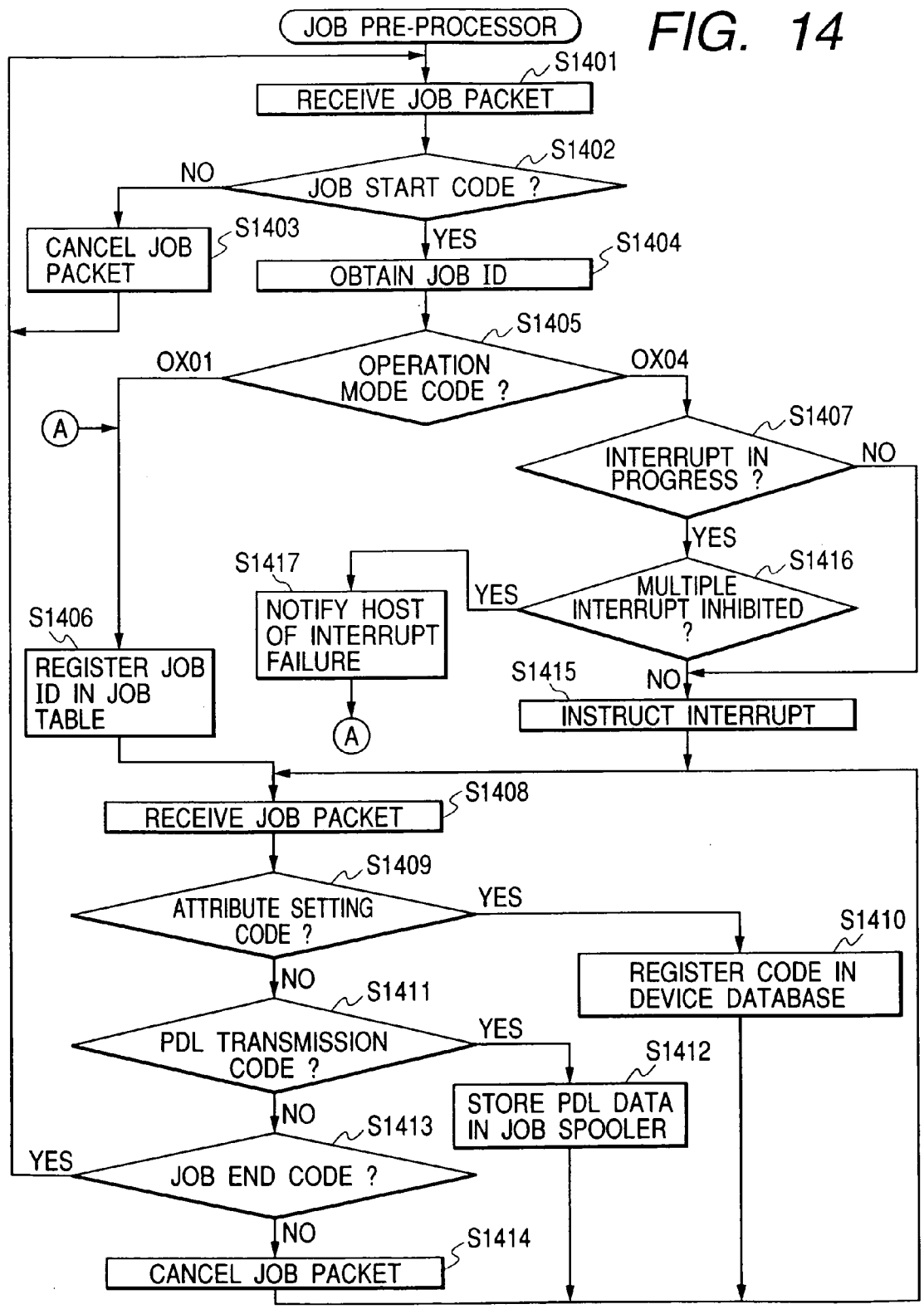
FIG. 14 is a flowchart for explaining the operation of a job pre-processor.

Now, the job pre-processor 303 which receives job packets will be described below. FIG. 14 is a flowchart showing the operation of the job pre-processor 303. In FIG. 14, the job pre-processor 303 is activated when the printer 300 is activated and it continues to operate until the power is turned off.

Firstly, at the step 1401, a job packet is received. When the job packet is received, it is determined at the step 1402 whether the operation code for the job packet is the job start operation code. If a job packet with any operation code other than the job start operation code arrives, the operation is considered to be illegal and the job packet is cancelled at the step 1403.

If it is determined to be the job start operation code, a job ID for the print job is obtained at the step 1404. The job ID is a 2-byte number issued in the printer 300 and used as a key for reading/writing job information in the device database 305.

Next, at the step 1405, it is determined which operation mode code is stored in the data section of the job packet.

If the operation mode code is 0x01, the job ID of the print job is registered with (added to) the job table 313 at the step 1406. In this case, the suspension flag in the job table is checked as described below and if the suspension flag is set to F, the current print job is added to the end of the registered print jobs.

If the operation mode code is 0x04, it is determined that any interrupt is already in progress at the step 1407. The process proceeds to the step 1416 if any interrupt is in progress and the process proceeds to the step 1415 if no interrupt is in progress. At the step 1416, it is determined whether multiple interrupt processing is prohibited. Such an prohibition is specified with the operation panel 314. The process proceeds to the step 1417 if it is prohibited and the process proceeds to the step 1415 if it is not prohibited.

At the step 1417, the host computer is notified of interrupt print failure. The job pre-processor 303 instructs the information manager 310 to issue a failure notice event. Then, the failure notice event is transmitted to a notice address. Like job packets, a failure notice event has the packet structure as shown in FIG. 11. It should be appreciated, however, that the failure notice event has the operation code 0x000a and the notice flag bit and the reply send bit are set to 1. An event ID which indicates an interrupt failure (=0x0008) is stored in the data section.

When the utility 205 receives a failure notice event, it displays a pop-up dialog to notify the user of an interrupt print job failure through a graphical user interface. At the step 1415, the interrupt processor 312 is instructed to process the current print job as an interrupt print. At the point of time, the job ID obtained at the step 1404 is also transmitted to the interrupt processor 312.

Then, at the step 1408, a second job packet is received. At the step 1409, it is determined whether the operation code in the second job packet is the attribute setting operation code. If it is the attribute setting operation code, the code is registered with the device database 305 as job information for the print job at the step 1410. It should be appreciated that the key at the point of time is the job ID obtained at the step 1404 as well as the attribute ID and the attribute data (attribute value) stored in the data section of the job packet.

When the attribute setting (registration of job information) is completed, the process returns to the step 1408 to receive a third job packet.

Then, at the step 1411, it is determined whether the operation code in the received job packet is the PDL data transmission operation code. If it is the PDL data transmission operation code, the PDL data is stored in the job spooler 304 at the step 1412. At the point of time, the PDL data is stored by using as a key the job ID obtained at the step 1404 and when the PDL data is taken out later, the job ID is used as a key again. The job spooler 304 associates the job ID with the PDL data for storing the PDL data. When the PDL data is added to the job spooler 304, the process returns to the step 1408 to receive a fourth job packet. If the operation code is not the PDL data transmission operation code at the step 1411, the process proceeds to the step 1413.

At the step 1413, it is determined whether the operation code in the job packet is the job end operation code. If it is the job end operation code, the process exits from the loop to return to the initial step 1401.

If the operation code in a job packet is not any of the predefined ones, the job packet is determined to be illegal and cancelled at the step 1414.

With the process described above, the job pre-processor 303 distributes the job information for the job packet to the device database 303 and the PDL data in the job packet to the job spooler 304.

Now, the utility 205 will be described below. The utility 205 is used by the user to display a list of print jobs and attributes, to cancel a print job, to instruct an interrupt print job, to suspend or resume a print job, or to promote a print job.

An operation instructed with the utility 205 is actually performed by communicating a management packet between the host computer 200 and the printer 300 through a management channel. Like job packets, a management packet has the data structure as shown in FIG. 11. Information items in a packet header contained in bytes 0 to 11 are similar to those for a job packet. It should be appreciated, however, that a management packet has the following operation codes:

0x010b: Print job cancellation

0x0123: Interrupt print job instruction

0x010d: Print job list acquisition

0x0120: Print job suspension

0x0121: Print job resumption

0x0022: Print job promotion

0x0105: Attribute setting

0x0106: Attribute acquisition

0x0110: Printer stop

0x0111: Printer restoration

0x011a: Printer reset.

Unlike job packets, each management packet is used for its unique object.

When a print job is transmitted to the printer 300 in job packets, the printer 300 stores the job ID and job information in the device database 305 with the aid of the job pre-processor 303.

When the utility 205 wants to know which print job is passed to the printer 300, a management packet with the print job list acquisition operation code (0x010d) is transmitted to the management channel. An object ID indicating the print job class which is an object to be acquired (=0x0102) is stored in the data section. Then the management packet is transmitted to the information manager 310 through the logic channel controller 206, the I/F driver 204, the interface 210, the interface 311, the I/F driver 301, and the logic channel controller 302.

The information manager 310 knows that this is a print job list acquisition operation based on the operation code in the received management packet, acquires print job list information stored in the device database 305, and transmits a reply packet with the list information. In the data section of the reply packet, the number of print jobs recognized by the printer 300 and a list of job IDs of the print jobs are stored.

When each print job is given the job name, owner, and size information through a job attribute setting operation, the utility 205 can acquire detailed information for the print job. For this purpose, the utility 205 transmits a management packet with the attribute acquisition operation code (=0x0106) to the printer 300 after it has acquired the list of print jobs. In the data section of the management packet, the job ID of a print job to be acquired and the attribute ID of an attribute to be acquired are specified. For example, when the user wants to acquire the job name of a print job with the job ID 1, the job ID 1 and the attribute ID 0x0101 will be specified.

The information manager 310 knows that this is an attribute acquisition operation based on the operation code in the received management packet, acquires an attribute value for the specified attribute ID and the specified job ID from the device database 305, and transmits a reply packet with the value.

Figure 15:
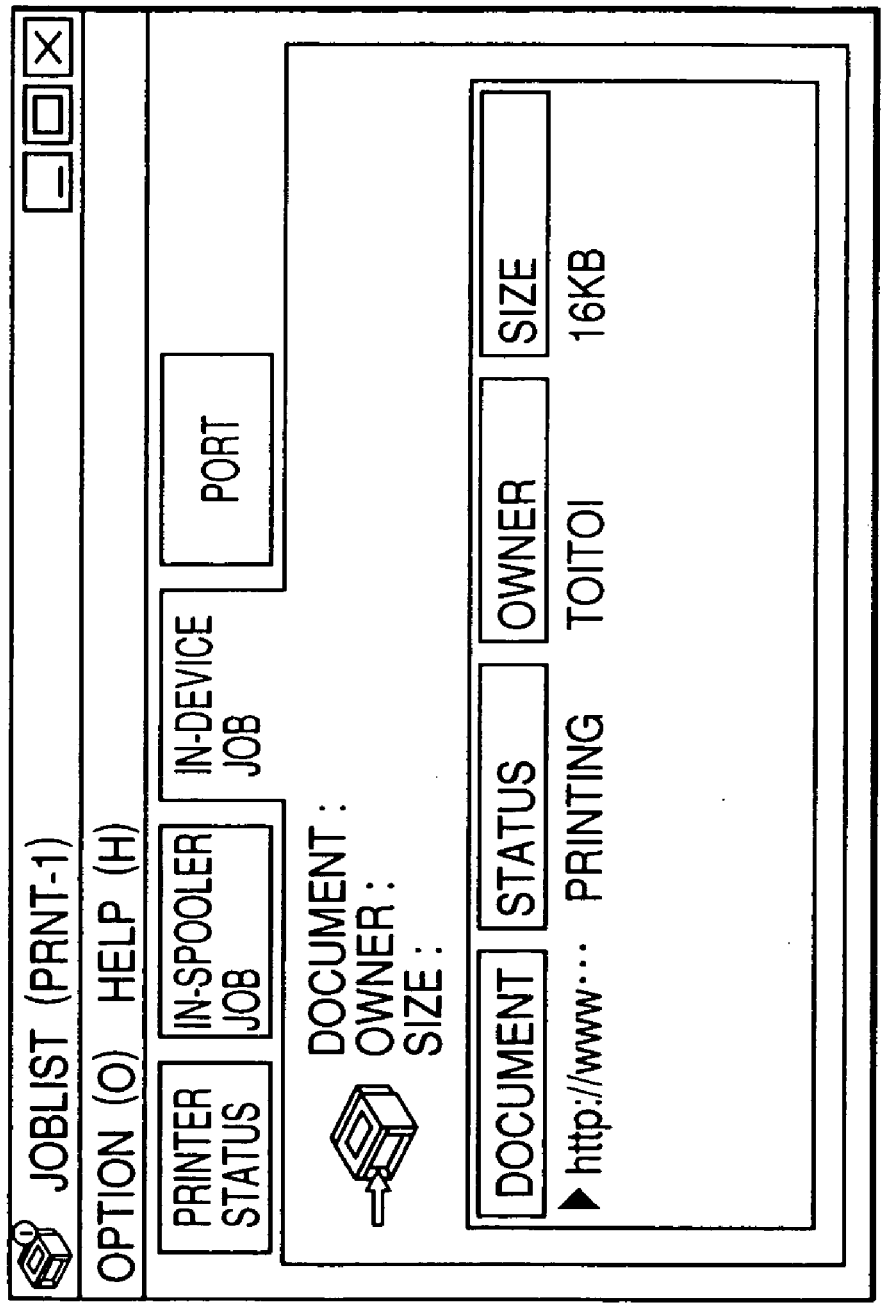
FIG. 15 shows an example of a user interface for displaying a job list.

FIG. 15 shows a user interface for displaying a job list with the utility 205. In FIG. 15, a job list for a printer with the device name "PRNT-1" is displayed. It should be appreciated that there exists only a print job.

The utility 205 issues a management packet with the print job list acquisition operation code to acquire a list of print jobs, and then issues a management packet with the attribute acquisition operation code for each of the print jobs in the list to acquire the attribute for each print job, and provides a resulting display based on the information acquired.

FIG. 15 shows that there exists a print job with the job name "http://www . . . ," that this print job is in a printing status, and that the owner name is "toitoi" and the size is 16 Kbytes.

The user can perform additional operations on the user interface shown in FIG. 15. The user uses a mouse to move the cursor onto a desired one of the print jobs displayed on the screen and presses down the right button of the mouse. Then, a selection screen which includes as additional menus the "CANCEL," "INTERRUPT PRINT," "SUSPEND," "RESUME," and "PREFERENTIAL PRINT" selections is displayed to allow the user to select a desired one.

When the user selects the "INTERRUPT PRINT," a management packet with the interrupt print job instruction operation code (=0x0123) is transmitted to the printer 300. In the data section of this management packet, the job ID of an interrupt-instructed print job is stored.

Lastly, the job table 313 will be described below. FIG. 16 is an explanatory view showing job tables. The PDL translator 306 selects print jobs in order as described in the job table 313 and then translates the PDL data for the selected print jobs.

In the figure, the job table 16-1 describes print jobs with the job IDs 1 to 4. Therefore, when the PDL translator 306 translates these print jobs, it selects the print job with the job ID 1, that with the job ID 2, that with the job ID 3, and that with the job ID 4 in descending order in the job table and then translates the PDL data for these print jobs.

When the job pre-processor 303 adds a print job with the job ID 5 to the job table 313, as shown in the job table 16-2, the print job with the job ID 5 is added to the end of the job table.

When the printer engine has ejected the last page of the print job with the job ID 1, as shown in the job table 16-3, the print job with the job ID 1 is deleted from the job table.

As described above, the job table 313 indicates the order of processing print jobs in the PDL translator and thus it is used to control the order of processing print jobs.

The pointer 1601 indicates which print job is associated with the PDL data being processed by the PDL translator 306. When the PDL translator 306 has translated all PDL data for a print job, the pointer 1601 will point to the next print job. In FIG. 16, the PDL data for the print job with the job ID. 2 is now being processed by the PDL translator 306. When the PDL translator 306 has translated all the PDL data for the print job with the job ID 2, the pointer 1601 will point to the print job with the job ID 3.

The suspension flag indicates whether an instruction to suspend a print job is issued. The print job is suspended if the suspension flag is set to True (T), and the print job is not suspended if the suspension flag is set to False (F). It should be appreciated that any of the print jobs with the job IDs 1 to 5 in the job table as shown in FIG. 16 is not instructed to suspend and there exists no suspended print job.

Now, the interrupt processing will be described below.

When the job pre-processor 303 recognizes an interrupt-instructed print job at the step 1405 shown in FIG. 14, it instructs the interrupt processor to execute an interrupt at the step 1415. At the same time, the job ID of the interrupt-instructed print job is also notified.

Figure 17:
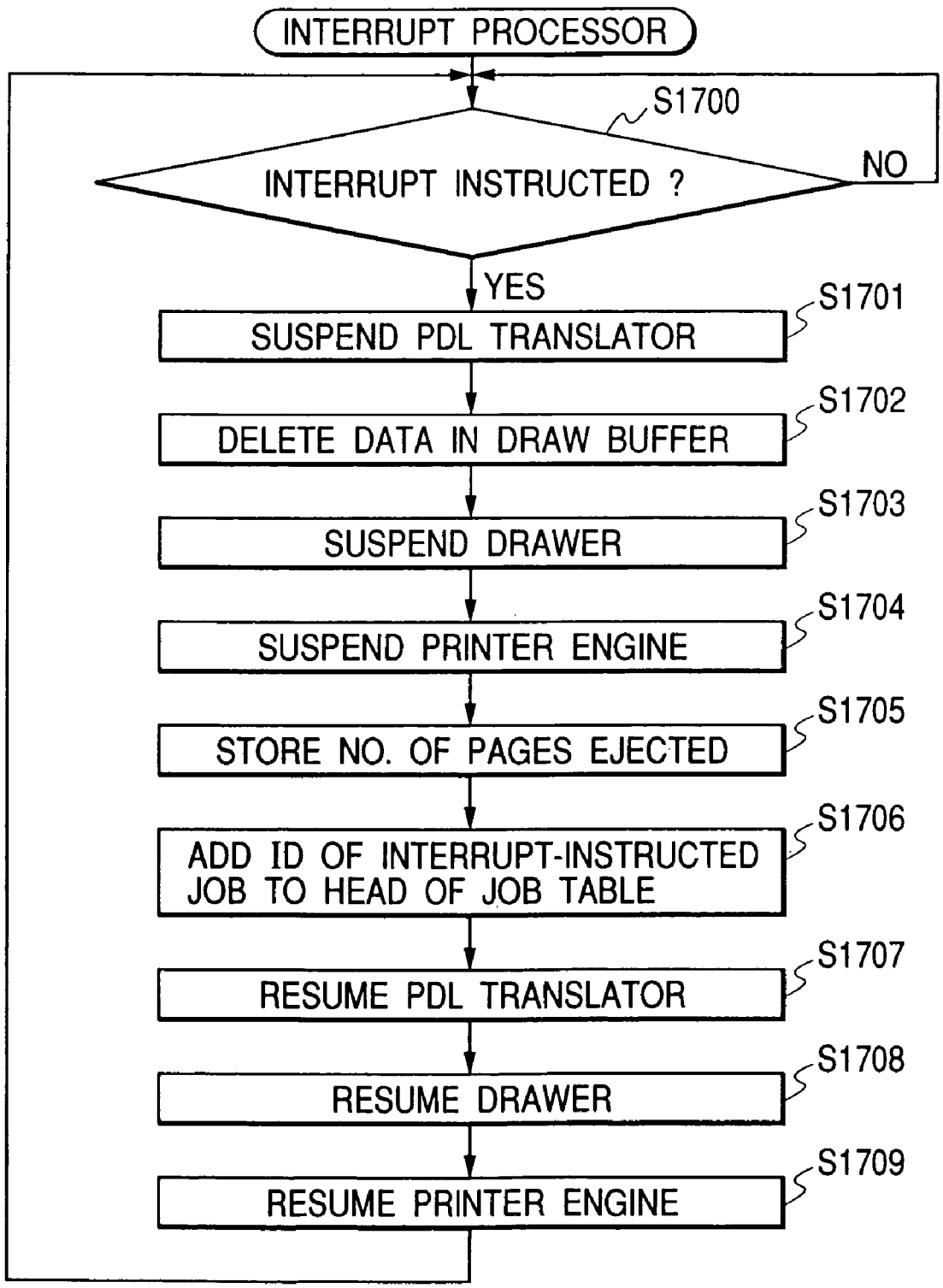
FIG. 17 is a flowchart for explaining the operation of an interrupt processor.

FIG. 17 is a flowchart showing the operation of the interrupt processor 312. Firstly, at the step 1700, the interrupt processor 312 determines whether an interrupt is instructed. If an interrupt is instructed, it instructs the PDL translator 306 to suspend a print job in progress at the step 1701. When the PDL translator 306 receives such an instruction, it promptly suspends the translation operation in progress.

Next, at the step 1702, intermediate data in the draw buffer 307, if any, is deleted. Such deletion of intermediate data can be accomplished not only by erasing the actual intermediate data but also by invalidating the intermediate data. At the step 1703, the drawer 308 is suspended. Then, at the step 1704, the printer engine 309 is instructed to suspend. It should be appreciated that suspension may cause jamming while the printer engine 309 is printing or ejecting paper. Therefore, the printing and ejecting operations are protected from being suspended.

At the step 1705, the number of pages which have been ejected during the interrupted print job is acquired from the printer engine 309 and stored in the device database 305 as job information for that print job. It should be appreciated that the printer engine 309 itself may perform this step and in that case, when the printer engine 309 receives a suspension instruction from the interrupt processor 312, it transmits the number of pages which have been ejected during the interrupted print job to the information manager 310, which stores the information in the device database 305 as job information for that print job.

At the step 1706, the job ID of an interrupt-instructed print job is added to the head of the job table 313. Then, the pointer 1601 moves to point to the job ID of this print job. The job ID is notified by the job pre-processor 303 along with an interrupt instruction. Thus, the job table 313 shows that the interrupt-instructed print job is the next print job to be processed.

Next, at the step 1707, the PDL translator 306 is instructed to resume. Then the PDL translator 306 looks at the pointer 1601 in the job table 313 and takes out the PDL data for a print job pointed by the pointer 1601 in the job table 313 (that is, an interrupt-instructed print job) from the job spooler 304 for translation. At the step 1708, the drawer 308 is instructed to resume and lastly, at the step 1709, the printer engine is instructed to resume.

Figure 18:
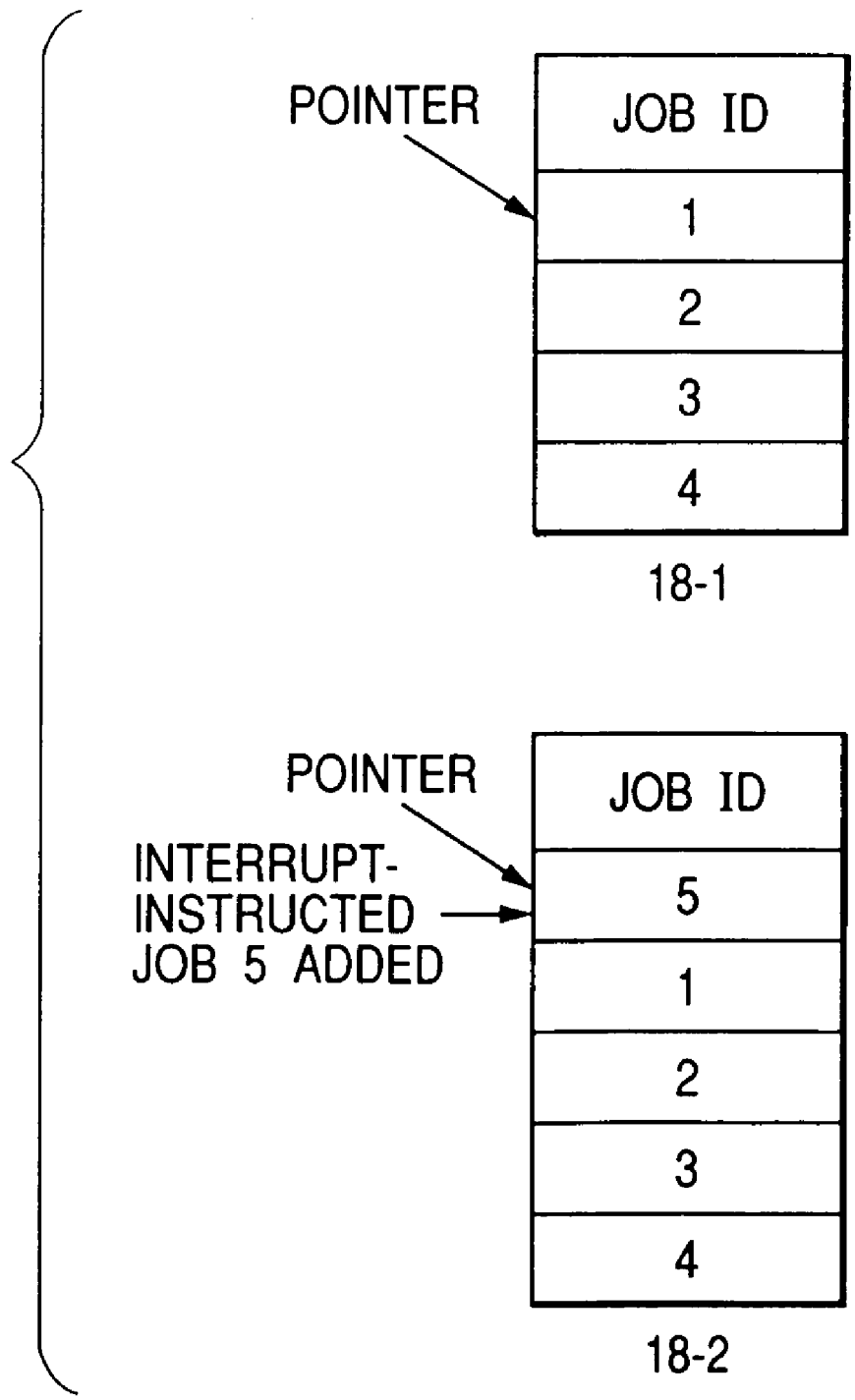
FIG. 18 is an explanatory view showing the status of a job table when an interrupt is processed.

FIG. 18 is an explanatory view showing the status of the job table 313 when an interrupt is processed. In the figure, no suspension flag is shown. The job table 18-1 shows that normal print jobs with the job IDs 1 to 4 are registered therewith and the job table 18-2 shows that an interrupt-instructed print job with the job ID 5 is added. When the interrupt-instructed print job with the job ID 5 is added, at the step 1706 in FIG. 17, the interrupt processor 312 adds the print job with the job ID 5 to the head of the job table, thus resulting in the job table 18-2.

When the PDL translator 306 receives an instruction to resume, the print job with the job ID 5, the print job with the job ID 1, the print job with the job ID 2, the print job with the job ID 3, and the print job with the job ID 4 are translated in this order because the PDL translator 306 processes the print jobs in order as described in the job table 313.

When the print job with the job ID 1 as shown in the job table 18-1 is interrupted during the ejecting operation, at the step 1705 in FIG. 17, the number of pages which have been ejected during the interrupted print job with the job ID 1 is stored in the device database 305 as job information for that print job. Then the print job with the job ID 1 is added to the head of the job table again and although the PDL translator 306 starts to translate the PDL data for that print job, the drawer 308 skips the ejected pages based on the ejected page number information for that print job. When the interrupted print job is restored, this can avoid any duplication of printed pages before and after the interrupt is executed and prevent any page from being printed twice.

It should be appreciated that in the printing system as described above, the print data and job management information are stored in the auxiliary storage but such data can be also recorded on an FD, MO, or other external memory medium. In addition, the management information can be modified by an application having the data setter editor 16 to the user's desired settings.

It should be further appreciated that in the printing system as described above, the host computer 1 is responsible for the print job control and display operations but the printer 2 may perform these operations alone or in cooperation with the host computer 1.

It should be further appreciated that an interrupt-instructed print job is processed in the above description but a preferential-instructed print job may be processed in a similar manner.

It should be further appreciated that the above-mentioned network environment includes parallel-connected devices as shown in FIG. 17 but the present invention may work with an environment locally connected to a server.

FIG. 19 shows a memory map of a memory medium to store various data processing programs which can be read by the information processor and the printer according to the present invention. It should be appreciated that information to manage the programs stored in the memory medium, for example, version information and creators (not shown) may be also stored and information dependent on the OS used by a program reader, for example, the icon identifying a program may be stored as well.

In addition, program-dependent data is also managed with a directory shown in FIG. 19. A program used to install another program in a computer and a program which decompresses a compressed program to be installed may be stored.

The features according to the present embodiment may be accomplished by a host computer through programs which are externally installed. In this case, information including programs may be provided to output devices through a CD-ROM, flash memory, FD, or other external memory medium or through a network.

From the foregoing, the objects of the present invention can be attained by providing a system or device with a memory medium in which software program codes to implement the features according to the present embodiment are stored and then causing a computer (or CPU or MPU) in the system or device to read the program codes stored in the memory medium for execution.

For this purpose, the program codes themselves to be read from the memory medium can implement the new features of the present invention and the memory medium in which the program codes are stored can constitute the present invention.

Memory media used to provide program codes include, for example, a floppy disk, a hard disk, an optical disk, a magneto-optical disk, a CD-ROM, a CD-R, a magnetic tape, a nonvolatile memory card, a ROM, and an EEPROM.

The features according to the present embodiment described above can be implemented by executing the program codes read by the computer and they may be implemented even if the OS (operating system) running on the computer performs some or all of actual operations according to instructions from the program codes.

Moreover, the features according to the present embodiment described above may be implemented even if the program codes read from the memory medium are written into memory mounted on an expansion board inserted into the computer or an expansion unit connected to the computer and a CPU mounted on the expansion board or the expansion unit performs some or all of actual operations according to instructions from the program codes.

What is claimed is:

1. An information processing apparatus which can communicate with a printer, comprising:
    a generation unit, adapted for generating a print job to be processed by the printer, based on application data;
    an instruction unit, adapted for instructing the print job generated by said generation unit to be interrupt printed by the printer;
    a reception unit, adapted for receiving job information from the printer indicating that interrupt printing of the print job instructed by said instruction unit has failed, the job information including information that can specify an owner of the print job;
    a determination unit, adapted for determining whether the owner of the print job specified by the information included in the job information received by said reception unit is identical to a user of said information processing apparatus based on the job information; and
    a notification unit, adapted for causing a display unit to display that the instructed print job has not been interrupt printed, if said determination unit determines that the owner of the print job is identical to the user of said information processing apparatus, and for not causing the display unit to display that the instructed print job has not been interrupt printed, if said determination unit determines that the owner of the print job is not identical to the user of said information processing apparatus.

2. An apparatus according to claim 1, wherein said notification unit causes the display unit to display an icon indicating that the instructed print job has not been interrupt printed.

3. An apparatus according to claim 1, wherein said reception unit receives from the printer some information indicating that the print job instructed by said instruction unit to be interrupt printed has not been interrupt printed.

4. An apparatus according to claim 1, wherein said notification unit notifies the user that the print job has not been interrupt printed but has been normally printed.

5. A print controller which can process print jobs from a plurality of information processing apparatuses, comprising:
    an interrupt unit, adapted for suspending a print operation for a print job and executing interrupt printing of another print job according to an instruction for interrupt printing;
    a determination unit, adapted for determining whether a print job for the interrupt printing is currently present;
    a decision unit, adapted for, in response to reception of an interrupt-instructed print job from one of the plurality of information processing apparatuses, deciding whether the received print job is to be interrupt printed, based on a determination provided by said determination unit; and
    a transfer unit, adapted for transferring, to the one information processing apparatus, job information indicating that the interrupt printing of the received print job has failed, the job information including information that can specify an owner of the print job, if said decision unit decides that the print job is not to be interrupt printed,
    wherein the one information processing apparatus causes a display unit to display that the print job has not been interrupt printed, if it is decided that the owner of the print job specified by the information included in the job information transferred by said transfer unit is identical to a user of the information processing apparatus, and does not cause the display unit to display that the print job has not been interrupt printed, if it is decided that the owner of the print job is not identical to the user of the information processing apparatus.

6. A print controller according to claim 5, further comprising a prohibition unit adapted for prohibiting multiple interrupts, wherein said decision unit decides that a received print job is not interrupt printed if multiple interrupts are prohibited by said prohibition unit.

7. A print controller according to claim 5, wherein execution of multiple interrupts means that an interrupt print is further executed while a previous interrupt print is being executed by said interrupt unit.

8. A print controller according to claim 5, wherein said print controller is a print controller for a printer.

9. A print controller according to claim 5, wherein said print controller is a print controller for a device having a copy function.

10. A print controller according to claim 5, wherein a received print job is processed in normal order if it is decided that the received print job is not interrupt printed.

11. A print controller according to claim 10, wherein said transfer unit transfers to an information processing apparatus some information indicating that a received print job is processed in normal order if it is decided that the received print job is not interrupt printed.

12. A method for information processing in an information processing apparatus which can communicate with a printer, comprising:
　a generation step of generating a print job to be processed by the printer, based on application data;
　an instruction step of instructing the print job generated in said generation step to be interrupt printed by the printer;
　a reception step of receiving job information from the printer indicating that interrupt printing of the print job instructed in said instruction step has failed, the job information including information that can specify an owner of the print job;
　a determination step of determining whether the owner of the print job specified by the information included in the job information received in said reception step is identical to a user of the information processing apparatus based on the job information; and
　a notification step of causing a display unit to display that the instructed print job has not been interrupt printed, if said determination step determines that the owner of the print job is identical to the user of the information processing apparatus, and of not causing the display unit to display that the instructed print job has not been interrupt printed, if said determination step determines that the owner of the print job is not identical to the user of the information processing apparatus.

13. A method according to claim 12, wherein said notification step causes the display unit to display an icon indicating that the instructed print job has not been interrupt printed.

14. A method according to claim 12, wherein in said reception step, some information is received from the printer indicating that the print job instructed in said instruction step to be interrupt printed has not been interrupt printed.

15. A method according to claim 12, wherein said notification step notifies the user that the print job has not been interrupt printed but has been normally printed.

16. A program stored on a computer-readable medium and executed by an information processing apparatus which can communicate with a printer, wherein said program causes the information processing apparatus to execute:
　a generation step of generating a print job to be processed by the printer, based on application data;
　an instruction step of instructing the print job generated in said generation step to be interrupt printed by the printer;
　a reception step of receiving job information from the printer indicating that interrupt printing of the print job instructed in said instruction step has failed, the job information including information that can specify an owner of the print job;
　a determination step of determining whether the owner of the print job specified by the information included in the job information received in said reception step is identical to a user of the information processing apparatus based on the job information; and
　a notification step of causing a display unit to display that the instructed print job has not been interrupt printed, if said determination step determines that the owner of the print job is identical to the user of the information processing apparatus, and of not causing the display unit to display that the instructed print job has not been interrupt printed, if said determination step determines that the owner of the print job is not identical to the user of the information processing apparatus.

17. A program according to claim 16, wherein said notification step causes the display unit to display an icon indicating that the instructed print job has not been interrupt printed.

18. A program according to claim 16, wherein in said reception step, some information is received from the printer indicating that the print job instructed in said instruction step to be interrupt printed has not been interrupt printed.

19. A program according to claim 16, wherein said notification step notifies the user that the print job has not been interrupt printed but has been normally printed.

20. A computer-readable memory medium which stores a computer program executed by an information processing apparatus which can communicate with a printer, wherein the program causes the information processing apparatus to execute:
　a generation step of generating a print job to be processed by the printer, based on application data;
　an instruction step of instructing the print job generated in said generation step to be interrupt printed by the printer;
　a reception step of receiving job information from the printer indicating that interrupt printing of the print job instructed in said instruction step has failed, the job information including information that can specify an owner of the print job;
　a determination step of determining whether the owner of the print job specified by the information included in the job information received in said reception step is identical to a user of the information processing apparatus based on the job information; and
　a notification step of causing a display unit to display that the instructed print job has not been interrupt printed, if said determination step determines that the owner of the print job is identical to the user of the information processing apparatus, and of not causing the display unit to display that the instructed print job has not been interrupt printed, if said determination step determines that the owner of the print job is not identical to the user of the information processing apparatus.

21. A computer-readable memory medium according to claim 20, wherein said notification step causes the display unit to display an icon indicating that the instructed print job has not been interrupt printed.

22. A computer-readable memory medium according to claim 20, wherein in said reception step, some information is received from the printer indicating that the print job instructed in said instruction step to be interrupt printed has not been interrupt printed.

23. A computer-readable memory medium according to claim 20, wherein said notification step notifies the user that the print job has not been interrupt printed but has been normally printed.

* * * * *

UNITED STATES PATENT AND TRADEMARK OFFICE
CERTIFICATE OF CORRECTION

PATENT NO. : 7,190,469 B1 Page 1 of 1
APPLICATION NO. : 09/664383
DATED : March 13, 2007
INVENTOR(S) : Gomi It is certified that error appears in the above-identified patent and that said Letters Patent is hereby corrected as shown below:

COLUMN 8:
Line 51, "0x016: Job size" should read --0x016a: Job size--.

Signed and Sealed this

Twenty-fourth Day of February, 2009

JOHN DOLL
*Acting Director of the United States Patent and Trademark Office*